Dec. 17, 1968  A. ERNST  3,416,367

HARDNESS MEASURING APPARATUS

Filed March 28, 1966  2 Sheets-Sheet 1

INVENTOR
ALFRED ERNST

BY Bailey, Stephens + Huettig
ATTORNEYS

Dec. 17, 1968  A. ERNST  3,416,367
HARDNESS MEASURING APPARATUS
Filed March 28, 1966  2 Sheets-Sheet 2

INVENTOR
ALFRED ERNST

BY Bailey, Stephens & Huettig
ATTORNEYS

United States Patent Office 3,416,367
Patented Dec. 17, 1968

3,416,367
HARDNESS MEASURING APPARATUS
Alfred Ernst, Via del Cairo 37, Varese, Italy
Filed Mar. 28, 1966, Ser. No. 538,029
Claims priority, application Italy, Apr. 15, 1965, 3,582/65
4 Claims. (Cl. 73—83)

ABSTRACT OF THE DISCLOSURE

A hardness measuring instrument has a penetrating means mounted for engagement with a test piece. An actuating member is connected to the penetrating means by spring arrangements which during travel of the actuating member first move the penetrating means towards the test piece, then apply a preload on the penetrating means and then apply a greater final pressure on the penetrating means. Means are provided to measure and indicate the penetration. The final pressure is released during the return movement of the actuating member; however, after this release, the indicating means is still operative.

---

The present invention refers to an apparatus for measuring the hardness of materials, which can be used to make accurate and rapid meaurements with load and pre-load, giving rise to a succession of various measurement operations by simply applying a gradual pressure by means of an actuation device to the outer casing of the apparatus, pressing it against the surface, the hardness of which is to be measured.

The present invention consists in an apparatus for measuring the hardness of materials, comprising on a base an actuation device and a measuring instrument, the latter comprising in combination: a penetrating means; a group of members enabling a pre-load to be applied to the penetrating means after said means have been brought in contact with the surface of the material the hardness of which is to be measured; a group of members enabling a load to be successively applied to the penetrating means to permit said means to penetrate into the material to a certain depth; a signalling device, preferably luminous; the penetrating means and said group of members, enabling the load to be successively applied, being operated by said actuation device through a common member preferably consisting of the outer casing of the instrument to which is applied a force causing it to approach the surface of the material, the hardness of which is to be measured; the measuring instrument being made in such a way that by applying and removing the pressure on the common member, the following operations take place in succession: the movement of the penetrating means towards the surface whose hardness is to be measured; application of the pre-load to the penetrating means; application of the load to the penetrating means; removal of the load from the penetrating means, and measurement of the depth of penetration under the pre-load, the signalling device functioning at the application of the pre-load and at the removal of the load.

Figure 1:
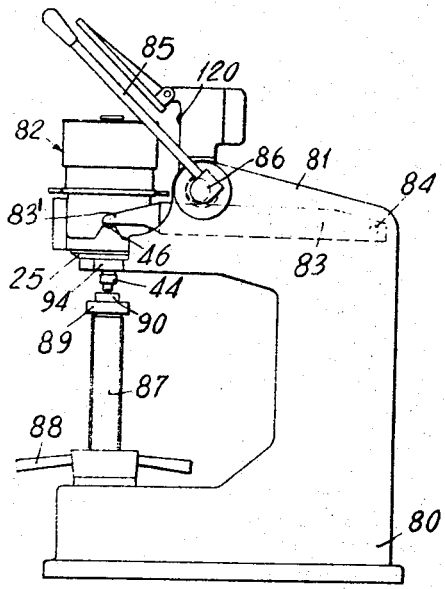
Figure 3:
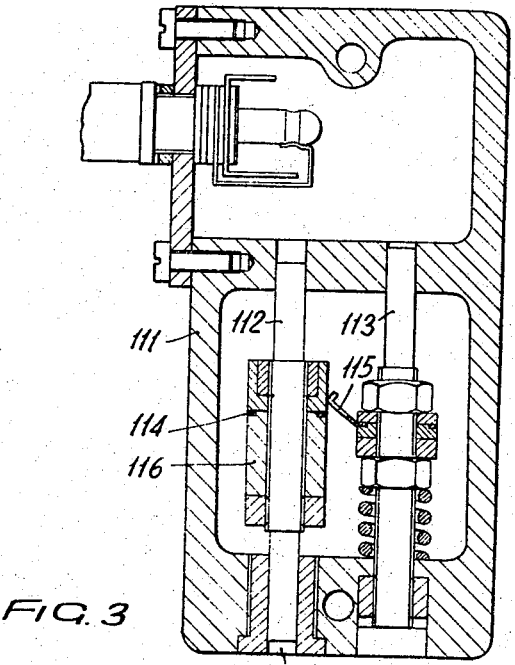
Figure 2:
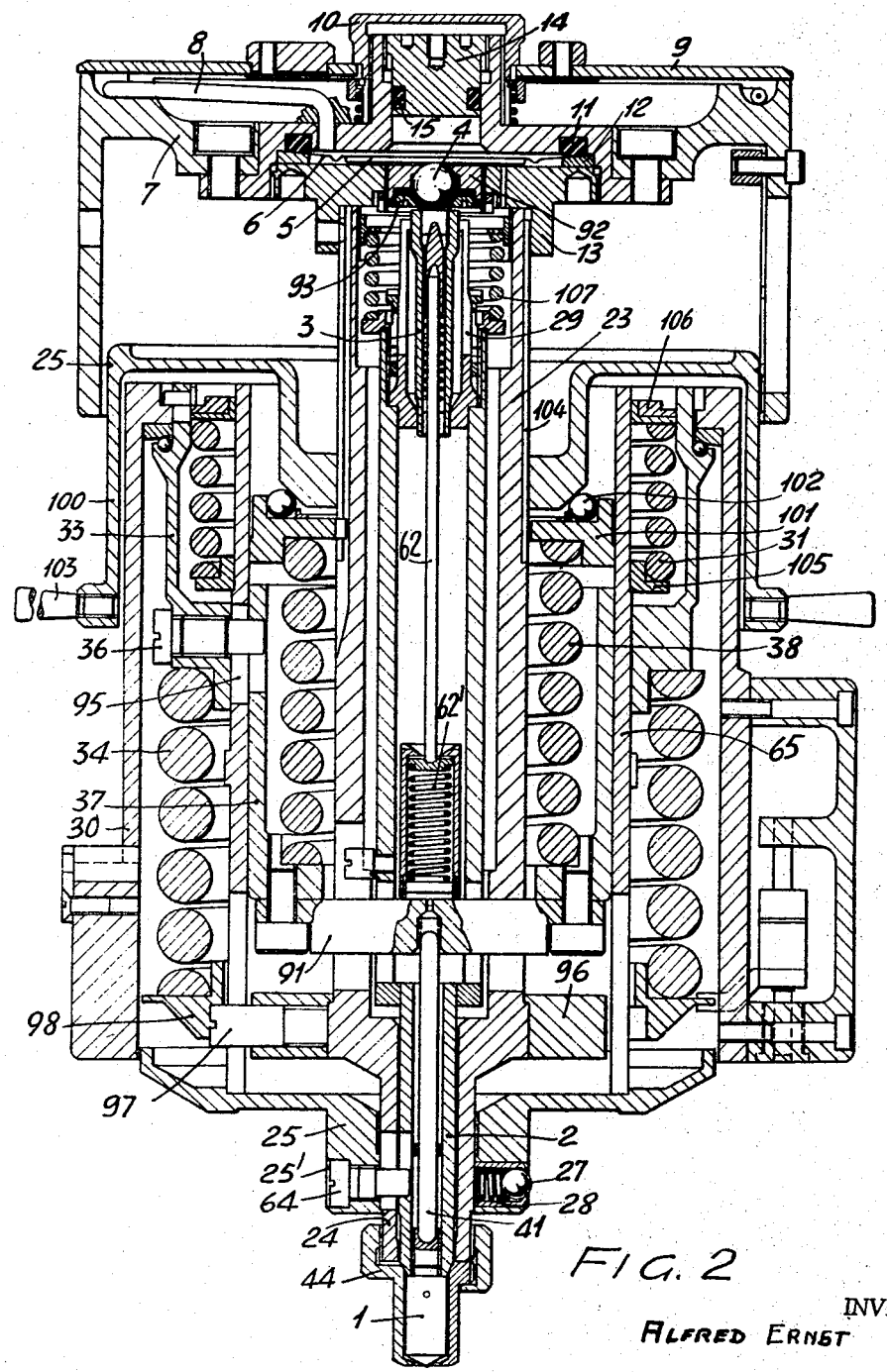

The invention will now be described by way of example only with reference to the accompanying drawings representing one preferred form of embodiment of the measuring apparatus, wherein:

FIGURE 1 is a side view of the measuring apparatus;
FIGURE 2 is a sectional view taken along the axis of the measuring instrument, which forms part of the measuring apparatus shown in FIG. 1;
FIGURE 3 is a sectional view of the contacts comprising the signalling device embodied in the measuring apparatus.

With reference to FIGURE 1, the measuring apparatus comprises a base 80, which from a lateral view resembles a G and supports the measuring instrument 82 at the end of the forked profile of the overhanging upper arm 81.

Inside the arm 81 there is a lever 83, pivoted at 84, whose free end terminates in a fork with two prongs 83' apt to engage with two pins 46 attached to the outer casing of the instrument 82. Lever 83 is actuated by another lever 85 through an eccentric 86. Column 87 on base 80 is raised or lowered by rotating hand-wheel 88. At the upper end of column 87 is platform 89, on which is placed sample 90, whose hardness is to be measured, and against which will be placed the penetrating tip 1 in its protective casing 44 of the instrument 82.

With reference to FIG. 2 (a sectional view of measuring instrument 82 taken along the axis thereof), said instrument 82 comprises the penetrating means 1, integrally connected with penetrating tip holder 2, formed of a number of parts, its upper part 29 being resilient.

The penetrating tip holder supports, in its upper part, a pre-load spring 107, which presses upward on the upper part of the cylindrical body 23 described later.

A slider 3 slides under friction between the prongs 29 of the penetrating tip holder 2, said slider having secured to its upper end a part firmly connected with sphere 4 which is in contact with disc 5 joined to a membrane 6. This membrane 6 defines a chamber in the body 7 which communicates with a capillary tube 8. This chamber and part of the capillary tube 8 contain a coloured liquid so that for a slight shift in the position of the membrane 6 there will be a correspondingly larger shift of the liquid inside the capillary tube, which can be easily read from the transparent graduated quadrant 9, held in place by knob 10. The whole of the foregoing system goes to make up a hydraulic measuring apparatus acting as a comparator. The chamber is sealed into the body 7 by a gasket 11 on which the membrane 6 is pressed by means of a first ring 12, held in turn by a threaded locking ring 13.

A threaded plug 14 and a washer 15 seal off the chamber and allow the level of the coloured liquid in the glass capillary tube 8, open at its end, to be controlled.

Sphere 4 can be raised by rod 62, which is connected to a cross-member 91, through a shock-absorbing spring 62'.

Sphere 4' is held inside the vertically displaceable ring 92 by threaded locking ring 93.

Cylindrical body 23 is screwed onto locking ring 13, said body 23 ending at its lower portion in a section of reduced diameter 24, which slides in ring 25 and the base of which rests on plate 94 forming the end of arm 81 of base 80.

Ring 25 and plate 94 are kept in their respective pre-established positions by ball 27 pressed upon by spring 28.

Ring 25 has screw 64 placed in its recess 25'; this extends into a slot in end piece 24 and serves as a guide for end piece 24 in respect to ring 25 and the penetrating tip holder 2. Screw 64 also extends into a slot in the tip holder 2 and thus limits the upward movements of the penetrating tip holder 2. Guard 44 for penetrating means 1 is screwed onto end piece 24.

There is a semi-spherical cavity at the upper end of the penetrating means 1 which takes the lower end of rod 41, whose upper end is adapted to be engaged by cross member 91.

Ring 25 is fixed to cylinder 65 which is a fixed guiding element for the entire system and has on its side surface three windows 95 placed at an angle of 120° with each other and into each of which projects a screw 36 described later.

Cylindrical body 23 is rigid with ring 96, which carries by means of three pins 97 a ring 98 on which rests spring 34.

Sleeve 33 engages the upper end of spring 34; said sleeve is inside casing 30 and engages with it through a number of bearings and with a certain amount of play.

Sleeve 33 carries three screws 36 spaced at 120° to each other which pass through window 95 of cylinder 65, support inner casing 37, against which acts a load spring 38, whose upper end rests, through ring 101 and a series of balls 102 on the threaded locking nut 100 which regulates the load.

The regulating threaded locking nut 100 has external handles 103 and by means of threading 104 can be screwed to a greater or lesser extent onto the cylindrical body 23.

The return spring 31 rests, on a ring 105 fixed on cylinder 65, which is a fixed element; and on ring 106 which is fixed to sleeve 33 and the outer casing 30 is pressed upon by the upper part of spring 31.

The embodiment described above operates in the following manner:

The measuring instrument as shown in FIG. 2 is ready to function; the end of the liquid column in the capillary tube 8 is at its maximum point because the springs 31 and 34 keep the outside cylindrical casing 30, which carries slider 3 and sphere 4, in its uppermost position in respect to fixed cylinder 65.

In this position spring 38 is supported by the three screws 36 which act against inner casing 37 on which the spring rests, and cross member 91, therefore, does not touch rod 41, preventing the load of spring 38 from acting on the penetrating means.

The whole instrument is raised up to its highest position by spring 31 which acting through ring 105 and sleeve 65, on ring 25 engaged on base 94, acts upwardly against cylindrical casing 30. At the same time screw 64 fixed with respect to ring 25 limits the upwards movement of the penetrating tip holder 2 integral with penetrating means 1, so that the penetrating means 1 protrudes a few tenths of a millimetre beyond guard 44.

The end of prong 83' is lowered by acting on lever 83 through eccentric 86, this acts on projection 46 of the outer casing 30 of the measuring instrument and presses down the actuating member 30 so that spring 34 is compressed and end piece 24 slides inside ring 25. At a certain point the end of penetrating means 1 will come in contact with the surface of the material being tested, coming to a stop, while the action of the downwards pressure exerted by the lever means continues. The penetrating means acts against the surface to be measured in a smooth, gentle manner, since the upper part of the penetrating tip holder 2 slides with light, elastic friction on slider 3 and this action continues until the guard 44 for the penetrating means 1 has come to rest against the material to be measured; at this moment the whole portion of the apparatus which is fixed with respect to the cylindrical body 23 will come to a stop. From this moment, the load which acts against the diamond point of the penetrating means 1 will consist solely of the friction of the slider 3 inside the prongs 29 and the reaction of the pre-load spring 107.

As membrane 6 is pressed upon sphere 4 through disc 5, the liquid in the capillary tube 8 assumes a certain position determined by the pre-load. At this point quadrant 9 is rotated until the zero mark is lined up with the meniscus of the capillary liquid.

The descending action exercised by the lever means continues and sleeve 33 is lowered spring 34 is compressed, screws 36 are lowered and allow inner casing 37 with cross-member 91 to lower under the action of load spring 38, till said cross member 91 comes into contact with rod 41. From this moment, the load on spring 38 acts, through cross member 91, on the penetrating means 1, and makes it penetrate the material to be measured, to a greater or lesser depth, depending on its hardness.

During this stage of the application of the load to the penetrating means 1, the liquid moves in the capillary tube actuated by sphere 4 and disc 5, and its meniscus reaches a certain point on the scale and stops. At this point the lever 85 is slightly raised and the road lifted, the instrument returns to its pre-load position, recognisable by a certain position of the meniscus. This position on the scale corresponds to the value of the hardness of the material under examination.

In the above description the load is applied through the action of load spring 38. This spring can also be loaded to a greater or lesser degree before activating the measuring instrument, by rotating the threading locking nut 100, and the value of the load can be read off from a graduated scale visible through a window of the cylindrical part of body 7, by lining up a reference mark made on the threaded locking nut itself.

As mentioned above, instrument 82 has a signalling apparatus, preferably luminous, whose contact devices are represented in the lower right hand side of FIG. 2 and in FIG. 3.

The signalling apparatus comprises two small columns 112 and 113 respectively which are inside casing 111, secured to the outer casing 30 of instrument 82.

Column 113 is fixed onto housing 111 and carries an adjustable contact blade 115. Column 112 on the contrary, is joined to instrument 98 and slides with respect to casing 111, into a cavity 118 in the casing itself. Column 112 carries a small cylinder of insulating material 116 inside which is inserted a contact blade 114.

When ring 98 moves during pre-load, blade 115 rubs against blade 114 (blade 115 having been pre-set) and switches on lamp 120 (FIG. 1) connected in the same circuit as the two blades.

More precisely, the contact and consequent lighting of the lamp occurs at the moment of pre-load and therefore when the instrument is set at zero, and thereafter when the load is applied and then removed and the system returns to its pre-load state, and the hardness is read off.

It is evident from the above description that the measuring instrument is worked by the simple lowering and successive returning of a lever, all the complex measuring operations following automatically. This permits easy and rapid use. By eventually substituting an electronic comparer in place of the hydraulic one in use, the instrument can be controlled automatically.

The apparatus can be provided with a device adapted to brake the descent and raising of the lever 85, at the moment the lamp 120 is switched on, so that the operator can better realise when he has to carry out the reading of the instrument.

It is understood that the shape and size of the parts comprising the apparatus embodying this invention may vary, consistent with the description given herein, without therefore, departing from the scope of the present invention.

What is claimed is:

1. Apparatus for measuring the hardness of a material comprising:

a base means;

a penetrating means;

a shroud means around said penetrating means;

said penetrating means projecting out of said shroud means;

means mounting the shroud means and the penetrating means for relative movement in the actuating means;

means mounting the penetrating means in the shroud means for relative movement with respect thereto;

an actuating member forming a housing for the tester mounted on the base means for movement with respect thereto in the direction of movement of the penetrating means;

first means responsive to the movement of the actuating means in a first part of its path of movement to move said shroud means and said penetrating means towards the surface of the material;

second means responsive to relative movement of the shroud and penetrating means to apply a preload pressure on said penetrating means;

third means within said actuating member housing responsive to the movement of the actuating member in a second part of its path of movement after engagement of the shroud with the material to apply a test load pressure on said penetrating means, to cause said penetrating means to penetrate into the material;

penetration measuring means operatively connected to said penetrating means;

said third means being rendered inoperative by movement of the actuating member in the other direction in the first part of such movement;

said measuring means being operative to indicate the position of the penetrating means after the third means has been rendered inoperative;

whereby to indicate the difference in the penetration produced by said preload means and said test load means, respectively;

and means operable from the outside of the actuating member housing to adjust said third means so as to vary said test pressure.

2. In a device as claimed in claim 1, signalling means for indicating the operation of the second means and the rendering of the third means inoperative.

3. In a device as claimed in claim 1, said second means comprising:

a member slidable with respect to said base connected to said penetrating means;

said member having resilient prongs at its end remote from the penetrating means;

and a slidable sleeve engaged by said prongs connected to the measuring means.

4. In a device as claimed in claim 1, said second means comprising:

a member slidable with respect to said base connected to said penetrating means;

said member having resilient prongs at its end remote from the penetrating means;

said measuring means including means forming a space for a liquid;

said chamber forming means including a diaphragm;

a capillary tube connected to said chamber;

a movably mounted sphere engaging said diaphragm;

and a slidable sleeve engaged by said prongs connected to said sleeve.

References Cited

UNITED STATES PATENTS

| 2,122,203 | 6/1938 | Gogan | 73—83 |
| 3,182,491 | 5/1965 | Tschrif et al. | 73—83 |
| 3,200,640 | 8/1965 | Ernst | 73—81 |

FOREIGN PATENTS

| 899,461 | 6/1962 | Great Britain. |

RICHARD C. QUEISSER, *Primary Examiner.*

J. H. WILLIAMSON, *Assistant Examiner.*

U.S. Cl. X.R.

73—81